June 3, 1924.
T. W. VARLEY
1,496,037
CONSTANT VOLTAGE VARIABLE SPEED GENERATOR
Original Filed June 7, 1921
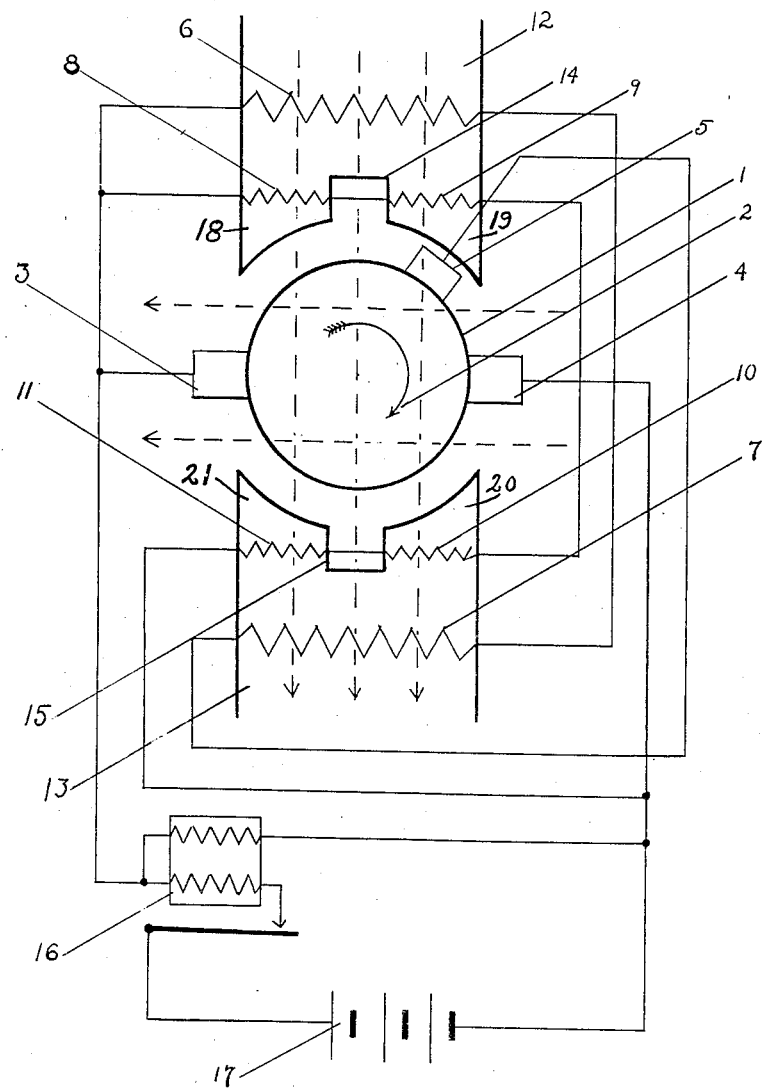
Thomas W. Varley INVENTOR
BY
Thomas Howe ATTORNEY Patented June 3, 1924.

1,496,037

UNITED STATES PATENT OFFICE.

THOMAS W. VARLEY, OF NEW YORK, N. Y.

CONSTANT-VOLTAGE VARIABLE-SPEED GENERATOR.

Application filed June 7, 1921, Serial No. 475,619. Renewed October 3, 1923.

*To all whom it may concern:*

Be it known that I, THOMAS W. VARLEY, a citizen of the United States, residing at city, county, and State of New York, have invented new and useful Improvements in Constant-Voltage Variable-Speed Generators, of which the following is a specification.

My invention relates to constant potential generators and more particularly to generators driven at variable speed.

It is an object of my invention to provide a generator which when driven at variable speed will develop constant voltage.

A further object of my invention is to provide a generator simple in construction and having few parts, to supply constant voltage without relays, resistance or complicated controlling devices.

A further object of my invention is to provide a generator for battery charging which eliminates all danger of over-charge.

Other and ancillary objects of the invention will appear hereinafter.

The invention may be described as a generator regulated for the desired potential across the main brushes wherein is employed a "third brush" between which and one of the main brushes is connected the field winding of the machine and the voltage across the main brush and "third brush" is caused to vary by shifting the field acting on the armature conductors between them as the voltage across the main brushes varies from the desired value so that that value will be restored.

To prevent armature reactions from interfering with the regulation, a compensating winding may be placed upon the frame in such manner as to neutralize, to any desired extent (or even to overcompensate), the armature reaction, compensating windings for thus neutralizing armature reactions being well understood in the art.

In the accompanying drawing, which illustrates the invention, is shown in diagram a dynamo electric machine embodying the invention, and the connections thereof.

Referring to the drawings, within the pole pieces 12 and 13 revolves a direct current armature having a commutator 1 on which bear the main brushes 3 and 4 and the "third brush" 5 which lies nearer the brush 4 and in advance thereof, the armature rotating in the direction as indicated by the arrow.

Connected across the brushes 3 and 5 are the main field windings 6 and 7 encircling the pole pieces 12 and 13 respectively in the well known manner to furnish the excitation for producing the line voltage at the main brushes 3 and 4.

The magneto motive forces for shifting the field to regulate the line voltage as above referred to are produced by the windings 8, 9, 10 and 11 wound respectively about the horns 18, 19, 20 and 21 on the pole pieces and connected in series across the main brushes 3 and 4 in such manner as to have a polarity tending to shift the field of the machine in the direction of rotation of the armature.

The horns, it will be seen, are formed by the slots 14 and 15 in the pole faces and extending axially of the armature. In these slots may be laid the compensating winding above referred to which will encircle the armature from end to end, be connected in series with the main circuit so as to vary its excitation in proportion to the load and have a polarity opposing the cross magnetizing turns of the armature.

The sides of the windings 8 and 9 which are in the slot 14 carry current in the same direction while the sides of the windings 10 and 11 in the slot 15 carry current in the same direction but opposite to that of the sides of the windings 8 and 9 in the slot 14, the current in the conductors in the slots 14 and 15 producing a cross magnetizing effect tending to shift the field laterally as above indicated.

Also across the main brushes 3 and 4, through a cut-out switch 16 of usual construction to cut out the storage battery when the generator voltage is too low or for any reason current tends to flow from the battery to the generator and to maintain connections at other times, is the storage battery 17 adapted to be charged by the generator.

To illustrate the operation of the apparatus, the apparatus is so proportioned, related and constructed that at an average speed of the armature, the desired voltage will exist across the main brushes 3 and 4 and the current in the shifting windings 8 to 11 will be such as to shift a large part of the field out of its influence on the armature winding between the brushes 3 and 5 so that the voltage across and the current in the main field windings 6 and 7 is well below the maximum. If now the voltage across the main brushes 3 and 4 decreases, due to decrease in speed or other cause, the shifting coils will be weakened, the amount of shift of the magnetic field lessened and a greater amount of the field flux will act upon the armature conductors between the brushes 3 and 5 thereby increasing the voltage across them and strengthening the main field windings so that the main voltage will be maintained at the desired value. If now the voltage across the main brushes increases due to increase in speed or other cause, the shifting coils will be strengthened, the field will be shifted to a greater extent out of its zone of action on the armature conductors between the brushes 3 and 5, the voltage across those brushes and the main field winding tends to fall. The voltage across the main brushes will therefore tend to fall and the voltage will thus be maintained at the value desired.

It will be understood by those skilled in the art that by the expression constant voltage it is not intended to express that the machines referred to necessarily have an absolutely constant voltage but that it is intended to indicate machines of the constant voltage type as distinguished from those of the constant current type and as is well known machines of the constant voltage type may have their voltage vary within limits. For instance, the over-compounded direct current machine in common use is of this type but its voltage varies to some extent.

Instead of placing the "third brush" 5 adjacent the brush 4 it may be placed nearer to and behind the brush 3. The shifting fields would then have such polarity as to shift the magnetic flux through the armature against the rotation of the armature and the leads to the main winding would be reversed to give the proper polarity.

It may be noted that the cross magnetizing turns of the armature tend to shift the flux in the same manner as do the shifting coils and this tendency may be counteracted by a compensating coil as before referred to but it is also to be observed that any tendency of the cross magnetizing turns to lower the voltage is opposed by the action of the shifting coils so that usually the compensating coil is unnecessary.

While the invention has been illustrated in what are considered its best applications it may have other embodiments without departing from its spirit and is not therefore limited to the structures shown in the drawings.

What I claim is:

1. A "constant potential" generator having main brushes and a "third brush," a field winding connected across said "third brush" and one of said main brushes and a flux shifting winding connected across said main brushes.

2. An electric generator having main brushes and a "third brush," a field winding excited according to the voltage between said "third brush" and one of said main brushes and a field shifting winding excited according to the voltage across the main brushes.

3. A "constant potential" generator having main brushes and a "third brush," a field winding connected across said "third brush" and one of said main brushes and a flux shifting winding connected across said main brushes, the regulation being effected by shifting the field flux from one side to the other of the space between the main brushes but having substantially no effect upon the total amount of flux acting upon the conductors between the main brushes.

In testimony whereof I have signed this specification this 4th day of June, 1921.

THOMAS W. VARLEY.